US005341936A

United States Patent [19]

Young

[11] Patent Number: 5,341,936

[45] Date of Patent: Aug. 30, 1994

[54] SCREENING DEVICE FOR A FIBER SLURRY, AND A BACKWASH MEANS THEREFOR

[75] Inventor: Douglas L. G. Young, Nashua, N.H.

[73] Assignee: Ingersoll-Rand Company, Woodcliff Lake, N.J.

[21] Appl. No.: 89,532

[22] Filed: Jul. 12, 1993

[51] Int. Cl.[5] .................... B03B 7/00; B07B 1/22

[52] U.S. Cl. .................... 209/17; 209/270

[58] Field of Search .................... 209/17, 270, 273, 303, 209/304; 162/55; 210/413, 415

[56] References Cited

U.S. PATENT DOCUMENTS

| | | | |
|---|---|---|---|
| 2,835,173 | 5/1958 | Martindale | 92/34 |
| 2,908,390 | 10/1959 | Rich et al. | 209/273 |
| 3,363,759 | 1/1968 | Clarke-Pounder | 209/273 |
| 3,404,065 | 10/1968 | Ingemarsson | 162/233 |
| 3,672,506 | 6/1972 | Syrjanen | 209/273 |
| 3,759,392 | 9/1973 | Syrjanen | 209/273 X |
| 3,939,065 | 2/1976 | Ahlfors | 209/270 X |
| 4,842,722 | 6/1989 | Holz | 209/270 |
| 5,143,220 | 9/1992 | Young et al. | 209/17 |
| 5,172,813 | 12/1992 | Ljokkoi | 209/270 |
| 5,176,261 | 1/1993 | Holz | 209/270 X |

*Primary Examiner*—Robert P. Olszewski
*Assistant Examiner*—Boris Milef
*Attorney, Agent, or Firm*—Robert F. Palermo; Bernard J. Murphy; James R. Bell

[57] ABSTRACT

A hydrofoil in close proximity to an outboard surface of a rotatable slurry screen, and a hydrofoil in close proximity to an inboard surface of the screen, cooperate to create high and low slurry pressures at the surfaces which result in causing the slurry to surge through the screen to backwash the latter, thereby dislodging slurry-borne substances which tend to clog apertures in the screen.

12 Claims, 2 Drawing Sheets

SCREENING DEVICE FOR A FIBER SLURRY, AND A BACKWASH MEANS THEREFOR

BACKGROUND OF THE INVENTION

This invention pertains, generally, to devices for screening fluid suspensions, such as screens and separators, and the like, and in particular to screening devices used in processing wood pulp slurries in papermaking processes, and to novel backwash means therefor.

Screenplates, or screens of such devices tend to clog with suspended fiber and, as a consequence thereof, means are required for cleaning the screens of the clogging fibers. Typically, hydrofoils are used to generate a backwash wave or surge to effect the necessary cleaning. In this, of course, there must be relative motion between the screen and the hydrofoil. The hydrofoil is arranged in proximate adjacency to the screen surface, whether the screen is cylindrical, disc or planar-shaped, or frustoconical.

The hydrofoils used for the aforesaid purpose may take many forms, including airfoil sections, radial vanes, and drum-mounted devices such as blades, bumps and half-foils. They are characterized by the generation of two, successive pressure pulses, in the slurry, the first pulse having a pressure greater than the ambient pressure, and the second having a pressure lower than the ambient.

Known apparatuses and devices which employ hydrofoils are characterized by high relative velocity between the screenplate or screen and the hydrofoil, and a backwash flow surge which is limited by various factors, in particular: by cavitation during the negative pressure pulse, and by a high, positive pulse resulting in an accept flow surge which tends to reduce separation efficiency.

The foregoing illustrates limitations known to exist in present screening devices. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing a screening device for a fiber slurry, comprising a screen for screening fiber slurry; a backwash generator, mounted in adjacency to the screen, for causing slurry to backwash through the screen; and means for causing relative movement between the screen and backwash generator, wherein the screen has first and second, opposite surfaces; and the backwash generator comprises means disposed adjacent to the opposite surfaces for causing slurry to surge through the screen from the first surface to the second surface, and from the second surface to the first surface.

Another aspect of the invention meets the aforesaid purpose by setting forth a backwash means, for a screening device for a fiber slurry, comprising a hydrofoil for mounting thereof in proximate adjacency to a fiber slurry screen of a screening device; wherein the hydrofoil has means formed thereon defining a barrier to slurry flow therealong, and for causing slurry to flow away from the hydrofoil, in a direction substantially normal to the hydrofoil.

The aforesaid and other aspects of the invention, will become apparent by reference to the following description of embodiments of the invention, when considered in conjunction with the accompanying drawing figures.

BRIEF DESCRIPTION OF THE DRAWING FIGURES

DETAILED DESCRIPTION

Figure 1:
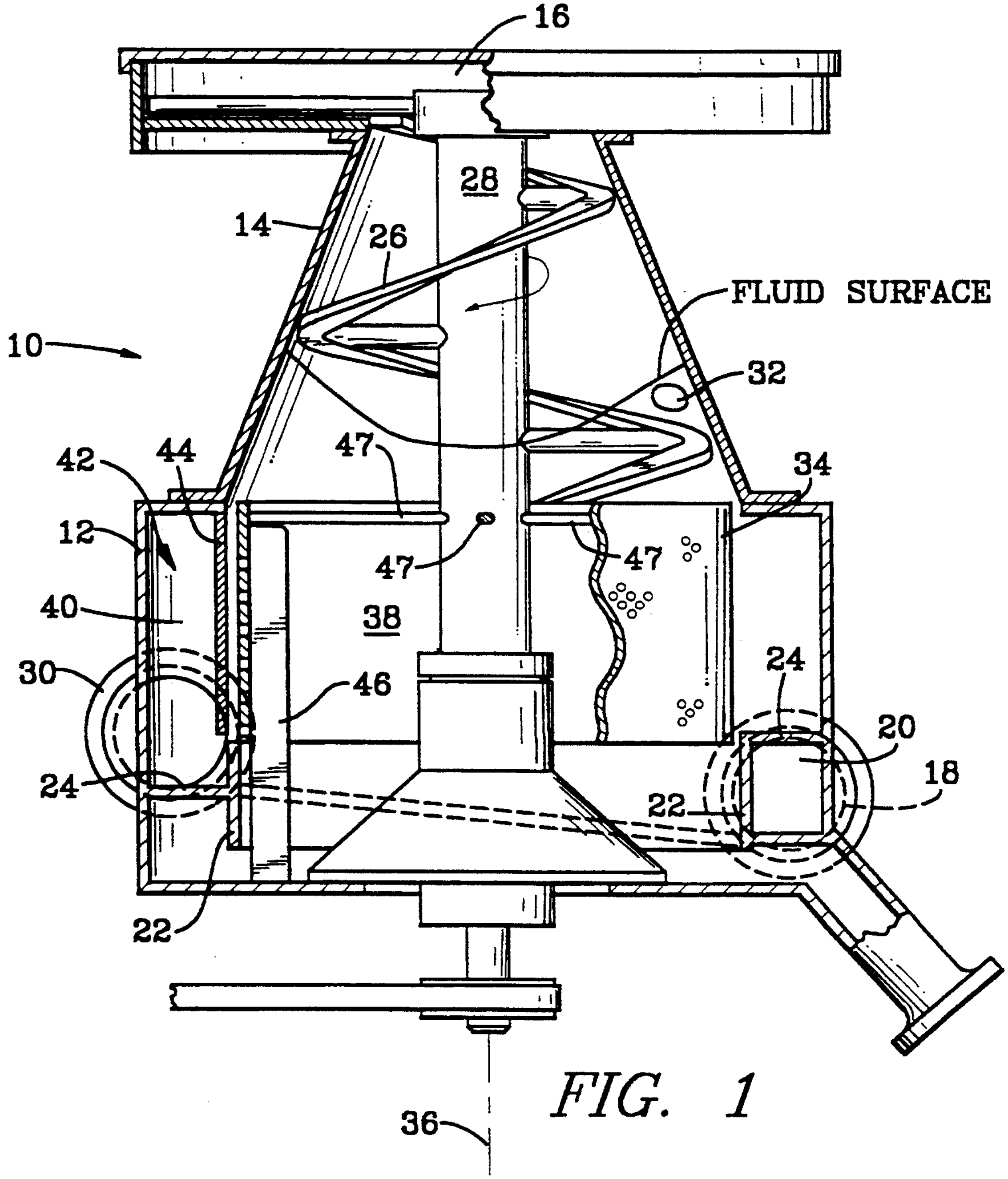
FIG. 1 is a partially-sectioned, elevational view of an apparatus, namely a screening device for a fiber slurry, incorporating an embodiment of the invention.

The screening device 10 of FIG. 1 corresponds, in general, to the same as disclosed in U.S. Pat. No. 5,143,220, issued Sep. 1, 1992, to Douglas L. G. Young and Donald B. Johnson, for "Apparatus for Screening to Remove Knots from a Fluid Borne Slurry of Fibers and Knots", incorporated by reference herein. It comprises a housing having a lower, cylindrical extension 12, and an upper, truncated cone extension 14. A fluid-free, coarse particle chamber 16 is fixed atop extension 14. Conduit 18 is the slurry inlet; the same communicates with an inlet chamber 20. Inlet chamber 20 is bounded by an inner wall 22, extension 12, and a roof 24 spiraling downward from inlet 18 until it approaches the bottom of the inner wall 22 where it ends. The screw flight 26 is for the transport of rejects to chamber 16; flight 26 is rotated by rotor 28. An outlet 30 carries the acceptable slurry and fibers off from the device 10, and a port 32 admits wash liquor into the extension 14. A perforated screen 34 is rotatable within the extension 12, about an axis 36. It confines a feed chamber 38 therewithin, and is surrounded by an accepts chamber 40. As priorly noted, reference may be had to U.S. Pat. No. 5,143,220 for a full understanding of the nature and function of the device 10.

The backwash means 42, according to an embodiment thereof, is incorporated with the screening device 10. It comprises a hydrofoil 44 and a vane 46, the former set in proximate adjacency to the screen 34 in the accepts chamber 40, and the latter being set in proximate adjacency to the screen 34 in the feed chamber 38. The hydrofoil 44 and vane 46 are in juxtaposition, straddling the screen 34 therebetween. The uppermost end of the vane 46 defines a clearance for limbs 47 which join the screen 34 to the rotor 28 for effecting rotation of the screen 34.

Figure 2:
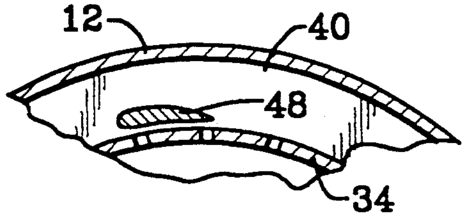
FIG. 2 is a cross-sectional view of a prior art backwash means for a screening device.

Functioning of the backwash means 42 can be understood with reference to FIG. 2. In U.S. Pat. No. 5,143,220, a hydrodynamic foil 48, axially coextensive with, and positioned outboard of the screen 34, albeit in close proximity thereto, was disclosed. As the rotating screen 34 passed the foil 48, the slurry passing between the screen 34 and foil 48 received a pressure pulse which contributed to an expelling of such slurry-borne substances which plugged the apertures in the screen 34. As priorly explained, such a foil 48 generates two, successive pulses.

The first of these is a positive, increased pressure, pulse, and this is followed by a negative, decreased pressure pulse. The resultant effect, in this configuration, was to produce a backwash flow surge contributory to a cleansing of the screen 34 but, also as noted priorly, the flow surge was limited by the low relative velocity of hydrofoil and screenplate, compatible with acceptable reject liquor content, turbulence and foaming of the liquor, the aforesaid cavitation during the negative pulse, and the accept flow surge which diminished slurry separation efficiency.

Figure 3:
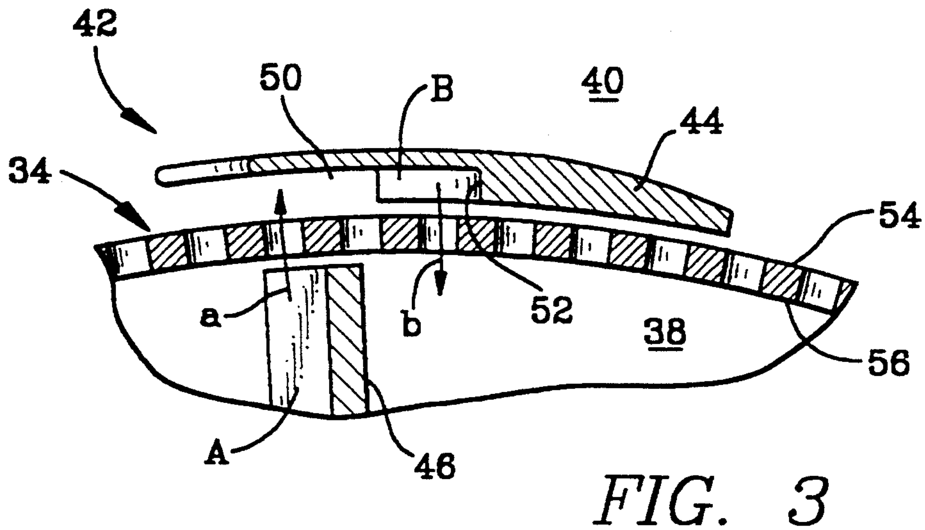
FIG. 3 is a cross-sectional view of a portion of a fiber slurry screen in association with the backwash means, according to an embodiment thereof and corresponding to the backwash means shown in FIG. 1, the view being a partial transverse section.
Figure 4:
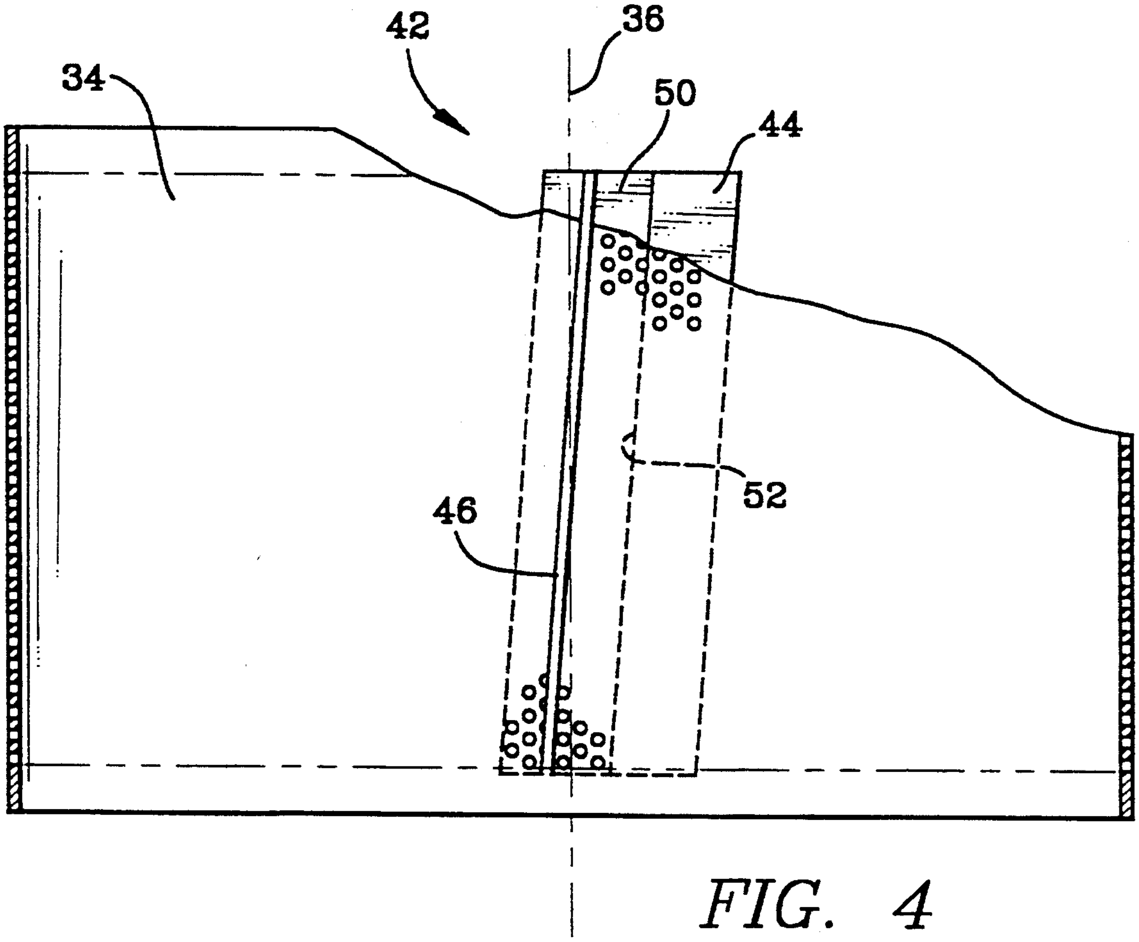
FIG. 4 is a partially-sectioned, elevational view showing the backwash means of FIG. 3 and the associated screen.

Backwash means 42 offers an improvement over the functioning of the foil 48 of FIG. 2, and can be seen to better advantage in FIGS. 3 and 4. Backwash means 42 comprises the aforementioned hydrofoil 44 and vane 46, both shown in cross-section in FIG. 3. Foil 44 is stationary in the accepts chamber 40, being fixed (by means not shown) in extension 12 (FIG. 1), and the vane 46 is stationary in the feed chamber 38, secured to extension 12 (by means not shown). Hydrofoil 44 is curved, to conform, generally, to the curvature of the thereadjacent screen 34, and has an inboard relief 50 formed therein which extends through approximately half the width thereof. The relief has a termination which defines a wall 52, the latter extending substantially normal to the outer surface 54 of the screen 34. The vane 46, too, has its width extending normal to the inboard surface 56 of the screen 34. As FIG. 4 shows, the hydrofoil 44 and vane 46 extend substantially the full depth of the screen 34, and preferably have a spiral angle such that both members are self-clearing of particles which may otherwise clog the clearance to the screenplate.

Vane 46 comprises a wall which serves as a barrier to slurry flow. It creates a stagnation pressure in the slurry, at "A" which causes the first surge flow of the slurry, as indicated by the heavy-line arrow "a", through the screen 34, from the feed chamber 38, into the relief 50 of the hydrofoil 44. A relative low pressure of the slurry obtains in the relief 50 but, with centrifugal-forced flow, the slurry encounters the flow barrier wall 52 of the hydrofoil 44. Here again, a stagnation pressure is created, at "B", which causes a second surge flow of the slurry through the screen 34, as indicated by the heavy-line arrow "b", from the outboard surface thereof, into the feed chamber 38. In the lee of the vane 46 a low pressure obtains and, as a consequence thereof, the second surge flow, addressed to the lee of the vane 46, is driven by a cumulative pressure and provides a backwashing of the screen of enhanced duration and amplitude.

Rotation of the screen 34, and the slurry flow direction, is shown by the broken arrows at the left-hand side of FIG. 3, and the slurry flow direction from the feed chamber 38 to the accepts chamber 40 is shown by the broken arrow at the right-hand side of FIG. 3.

The first surge flow "a" has the desirable effect of increasing the mean tangential velocity component of the slurry entering the relief 50 of the hydrofoil 44, and thus tends to increase the stagnation pressure at "B". Thus, there is a beneficial enhancement of the energy of the backwash flow surge "b" resulting from an additional increase in driving pressure thereof. In turn, this results from the relative location of the stagnation pressure at "A" at the vane 46 in the feed chamber 38, and the inflowing zone of the relief 50 of the hydrofoil 44 in the accepts chamber 40. The second surge flow "b" is the backwashing which clears away those substances which tend to clog the apertures in the screen 34.

The invention teaches the benefit of employing pairs of hydrofoils (i.e., a hydrofoil 44 and a vane 46) which cooperate in function. With a pair thereof located on opposite sides of the screen 34, the positive, increased pressure pulse of the first one acts cumulatively with the negative, decreased pressure pulse of the second one, to provide a backwash wave of enhanced amplitude and/or duration, and results in a minimal accept flow surge. Some of the benefits of the invention are: freedom from cavitation, increased stability of screen operation, and lower relative velocities, the latter offering lower power consumption, a reduced wear rate, and reduced maintenance cost and downtime. Additionally, and significantly, the slurry screening is rendered more efficient.

While I have described my invention in connection with specific embodiments thereof, it is to be clearly understood that this is done only by way of example, and not as a limitation to the scope of the invention, as set forth in the aspects thereof, and in the appended claims. For example, while the screen 34 is shown as rotatable, and the vane 46 and hydrofoil fixed, the screen could be fixed and the vane 46 and hydrofoil 44 rotatable therealong and thereabout. Too, although the accept flow direction is shown outwardly, it could just as well be inwardly. The screen 34 herein is cylindrical, but it could be a planar disc, or frustoconical and, as noted, fixed or movable, with the vane 46 and the hydrofoil 44 movable or fixed in relation thereto. Too, the invention can be practiced in an arrangement in which the screen 34 rotates in one direction, for instance clockwise, and the pair of hydrofoils (i.e., vane 46 and foil 44) rotate in the opposite, counterclockwise direction. In such an arrangement, the rotary speed of the screen and that of the hydrofoils could be substantially halved. Such relatively lower velocities could offer even further power consumption savings. Clearly, too, in an alternative arrangement, the vane 46 could be arranged in proximity to the outer surface of the screen 34, and the foil 44 disposed in proximity to the inner surface of the screen (with the cross-section thereof reversed, so that the relief 50 and wall 52 interface the screen 34). All such alterations and differing embodiments of the invention, as suggested herein by my disclosure, are deemed to be within the ambit of my invention and enhanced by the appended claims.

Having described the invention, what is claimed is:

1. A screening device for a fiber slurry, comprising:
a screen having first and second opposite surfaces;
first means, mounted in an adjacency to one of said screen surfaces, for causing slurry to surge through said screen from said one surface and exit onto the other of said surfaces; and
second means, mounted in an adjacency to said other surface, for causing slurry to surge through said screen from said other surface for exiting thereof onto said one surface; and wherein
said first and second means are in juxtaposition, and straddle said screen therebetween; and
said first means further comprises means for causing said slurry to impinge against said second means.

2. A screening device for a fiber slurry, according to claim 1, wherein said first and second means comprise slurry-flow barriers.

3. A screening device for a fiber slurry, according to claim 2, wherein said device has a rotary axis, and said barriers comprise walls extending substantially parallel to said axis.

4. A screening device for a fiber slurry, according to claim 2, wherein said screen is substantially circular, having a circumferential periphery, and said barriers are spaced apart from each other about said periphery.

5. A screening device for a fiber slurry, according to claim 3, wherein said screen has a circumferential periphery, and said walls are spaced apart from each other about said periphery.

6. A screening device for a fiber slurry, according to claim 1, wherein one of said first and second means comprises a hydrofoil, said hydrofoil has (a) a given width, (b) a relief formed therein extending through approximately half of said given width, and (c) a termination of said relief which defines a wall, and said wall extends substantially normal to said surfaces.

7. A screening device for a fiber slurry, according to claim 1, wherein one of said first and second means comprises a vane having a width which extends substantially normal to said screen surfaces.

8. A screening device for a fiber slurry, comprising:

a screen having first and second opposite surfaces; and an elongate hydrofoil mounted in proximate adjacency to one of said screen surfaces for causing slurry to surge through said screen, from said hydrofoil and said one surface, and exit onto the other of said surfaces, wherein said hydrofoil has (a) a given width, (b) a relief formed therein through approximately half of said given width, and (c) a termination of said relief which defines a wall, and said wall extends substantially normal to said one surface and extends throughout the full length of said hydrofoil.

9. Backwash means, for a screening device for a fiber slurry, comprising:

an elongate hydrofoil for mounting thereof in proximate adjacency to a fiber slurry screen of a screening device, wherein said hydrofoil has means formed thereon, and extending the full length thereof, defining a barrier to slurry flow therealong, and for causing slurry to flow away form sad hydrofoil, in a direction substantially normal to said hydrofoil.

10. Backwash means, for a screening device for a fiber slurry, according to claim 9, wherein said hydrofoil has (a) a given width, (b) wherein said therein extending through approximately half of said given width, and (c) a termination of said relief which defines a wall, and said wall comprises the aforesaid barrier.

11. A screening device for a fiber slurry, comprising:

first means comprising a screen for screening fiber slurry;

second means comprising a backwash generator, mounted in adjacency to said screen, for causing slurry to backwash through said screen; and means coupled to one of said first and second means for causing relative movement between said first and second means; wherein said screen has first and second, opposite surfaces; and said backwash generator comprises means disposed in juxtaposition adjacent to said opposite surfaces and straddling said screen for causing slurry to surge through said screen form said first surface to said second surface ad to impinge against a portion of said generator, and from said second surface to said first surface.

12. A screening device for a fiber slurry, according to claim 11, wherein said surge-causing means comprises slurry flow barriers, and said barriers comprise means for producing pressure pulses in the slurry.

* * * * *